June 28, 1927.

E. B. WILFORD 1,634,240

INSURANCE POLICY FORM

Filed Jan. 28, 1926         2 Sheets-Sheet 1

INVENTOR
Edward Burke Wilford.

WITNESS

BY
ATTORNEY

June 28, 1927.

E. B. WILFORD 1,634,240

INSURANCE POLICY FORM

Filed Jan. 28, 1926

2 Sheets-Sheet 2

WITNESS
F. J. Hartman

INVENTOR
Edward Burke Wilford
BY Frank H. Borden
ATTORNEY

Patented June 28, 1927.

1,634,240

UNITED STATES PATENT OFFICE.

EDWARD BURKE WILFORD, OF PHILADELPHIA, PENNSYLVANIA, ASSIGNOR OF ONE-FOURTH TO MAURICE R. SMITH, OF KANSAS CITY, MISSOURI.

INSURANCE-POLICY FORM.

Application filed January 28, 1926. Serial No. 84,485.

My invention relates to insurance policies.

It has been proven that a periodic physical examination, which may include an examination of the body, mind, or any excretion or secretion of the body, with resultant measures to guard against impending disabilities such as are usually undertaken when the necessity therefor has been discovered, has raised the expectancy of life of the person so examined, to a very appreciable extent. This fact has been widely exploited and such examinations urged by many humanitarian interests, but so far as known such examinations have been quite voluntary upon the part of the interested person.

It is well known, of course, that the companies insuring against death are interested in prolonging the life of the insured as long as possible, as they defer payments of claims on the policy that much longer.

It is an object of my invention to provide an insurance policy including a provision for periodic physical examinations as part payment of the premiums or for other considerations.

It is a further object of my invention to provide an insurance policy requiring the payment of cash premiums as is customary, but providing for a diminished or reduced cash premium if periodic physical examinations are taken.

It is another object of my invention to provide a policy requiring the payment of cash premiums as is customary, but providing for an increase in the face of the policy or amount of insurance if a periodic physical examination is taken.

It is a still further object of my invention to provide a policy in duplicate in which the fact of the physical examinations, the payment of the cash premiums, the change in the amount of the insurance, or any or all of them, may be noted properly on each of the duplicate copies.

It is still another object of my invention to provide an insurance policy in which the fact of the physical examinations, the payment of the cash premiums, or the change in the amount of the insurance, or any or all of these may be noted on the policy.

Another object of my invention is to provide physical means attachable to, or detachable from, the policy, indicating the fulfillment of a desired clause or clauses of the policy.

Further objects and advantages of the invention will become apparent from perusal of the following description, in connection with the associated drawings.

In carrying out my invention in its broadest sense, I provide in an insurance policy a clause providing for a periodic physical examination. In a commercially adaptable form of my invention I provide means for indicating on the face of the policy the fulfillment of the conditions required. In a particular embodiment of the invention I may provide means detachable from one of a pair of policies, the means attachable to the other, and in its original attached condition indicative of the non-fulfillment of a clause of said policy.

In the accompanying drawings:

Fig. 1, represents a plan view of a page or of a rider for a page of a policy in accordance with my invention, having spaces to receive the coupons to be later affixed, and showing one such coupon in place in its appropriate space, Fig. 2, represents a plan view of a page or a rider for a page of a policy, showing the detachable coupons carried thereby, one such having been detached, for application to the page shown in Fig. 1, Figs. 3, 4, 5, 6, and 7, represent modified forms of coupons with different wordings according to the significance it is desired to have attached to them, Fig. 8, is a representation of a plan view of a modified form of page or rider of a page of a policy, with a series of detachable elements beneath the page, upon which the data of the original and of subsequent examinations may be made or recorded, the elements bearing copies of the records on the page, and detachable as noted, Fig. 9, represents a plan view of an executed or filled in supplemental strip or element as shown in Fig. 8, and Fig. 10, represents a plan view of a page or rider for a page, upon which in desired spaces, the strips shown in Figs. 8 and 9 may be affixed.

It would be of such value to an insurance company to have its insured persons each submit to a physical examination, or analysis of any excretion or secretion of the body, that they could well afford to offer the insured a reduced premium if such examinations were taken periodically. It is part of my invention to provide for a determined and established cash premium for the policy offered, in accordance with the tables of payments, by the age of the insured, as is well known. The insured is then offered a substantial reduction in the cash or other premium or consideration, in return for other consideration, to wit: a periodic physical examination. It will be appreciated that the term "physical examination", may include any sort of examination desired, whether of the mind, the body, or the secretions or excretions of any portions of the body. The reduction offered may be in the form of a reduced premium, a dividend, a cash bonus returned by the company, a change in the face value of the policy, or any combinations or all of them, as may be deemed most expedient. In this way it is contemplated that the periodic physical examination will be part of the consideration.

The value of the examination is obvious, as it is well known that many trivial ailments with potentials of destructive growth can be detected and eradicated before injury starts. Few indeed there are who would permit a bad physical condition to continue if corrective measures were possible. Such corrective measures would not necessarily be within the scope of the activities of the companies, although obviously submission to such treatment as is necessary might be part of the obligations of the insured. It is thought that merely pointing out such defects as exist, possibly with recommendations as to treatment would suffice to put the insured on his guard, and would be to the benefit of the company through prolonging the life of the insured.

Although many devices and forms of policies will occur to those skilled in the art, to secure the desired results and to cause such examinations to be made at desired intervals, it will be apparent that it would be desirable to indicate the completion of each examination, the payment of the premium, or both in some manner, on the face of the policy. With such matters showing on the face of the policy of the insured, collections of claims thereon would be facilitated. It will be apparent that it is of importance that the policy retained by the company, a substantial duplicate of the insured's policy, should also bear evidence of the completion of such periodic examinations, the payments of the premiums, or both.

Although policies are more or less standardized, there are some companies which provide space on the policy to record the original physical examination. As some companies do not so provide, the policy shown in Figs. 1 to 7, may be used.

In this policy, the insured's copy is provided with sticker or notation receiving blanks 10, on the page 11. The company's policy with proper identifying data thereon, carries a series of detachable pasted elements or coupons 12, to be torn from the page 13 of such policy. Upon the completion of the physical examination by the physician for the company, he transmits a report thereof with a copy for the insured, to the company, which after proper entry on its books will detach the appropriate sticker or coupon 12 from the page or sheet 13 on its policy, and mail or send it to the insured. This may be accompanied by a copy of the physician's report with recommendations. The insured sticks or pastes the coupon or sticker 12, thus received, in its appropriate space 10 on his copy of the policy, and that part of the transaction is concluded. Obviously the time of taking the examination may be coordinated with the time for payment of the premium, and therefor the sticker detached by the company and attached by the insured may represent the completion of a physical examination, as at $12^a$, in Fig. 3, the payment of a cash premium only, or cash premiums and the physical examination as $12^c$ in Fig. 5. For this purpose the physical examination may be considered as cash. The sticker or coupon $12^d$ in Fig. 6 may also denote an increase in the amount of the insurance, that is an increase in the face value of the policy, when attached to the insured's policy in the sticker or notation receiving blanks or spaces 10 or as shown in Fig. 7, the sticker or coupon $12^e$ may represent an increase in the face value, payment of a premium and a physical examination.

In another form of my invention, the insured's policy has a page 14, with a column 15 listing the organs and other points of examination. Beside this column there are a number of other columns parallel with the first as at 16, possibly dates, as the time at which the physical examinations should be taken, with spaces for the entry on the policy of the conditions found with each organ or point of examination by the examining physician. Each subsequent examination after the first or original one, upon which the policy is issued, is entered in parallel spaces beside the notes or notations of the original. Thus the insured not only has evidence of the completion of the examinations, but the physician's signature at a desired point in the column, but he also has the results before him and can take proper remedial measures as they may be found necessary or advisable. The physician, before starting the examination may have a plurality of supplemental strips 18, each strip being pasted or glued on the back for subsequent pasting as will be readily understood, and lined with transverse parallel lines as at 19, to register with the lines 17, between the items listed for examination and upon which entries may be made as the examination is conducted, on the policy.

For purposes of record for the physician and of convenience for the insured, it will be appreciated that the entries may be made directly upon a form of examination retained by the physician, similar in all essential respects to the form on the policy under consideration, and that copies of the record may be made by carbon copy or other desired means upon one or more of the supplemental strips 18. If the insured has brought his policy with him, the entries may be made directly thereon in the appropriate column, and signed and dated by the physician, after placing one or more of the supplemental strips 18 in copying registry with the column in such manner that the copies of the original are had upon the supplemental strips. Space is provided, as at 20, for the signature and possibly for the comments of the physician, or a seal or other identifying matter, to verify the completion of the examination. If the insured has failed to bring his copy of the policy with him, he is furnished with one of the strip copies of the examination which he may later paste or glue, or otherwise affix on his policy, to evidence thereon the completion of the examination. If he has also paid a cash premium at the time, the record can be formed to include a receipt thereof, as will be obvious, as will the fact that the strip may also be so formed as to indicate an increase on the face value of the policy.

The physician will then transmit one of the strips 18 to the company, bearing on its face the copy of the record of the examination which is then pasted or otherwise secured to the copy of the policy retained by the company. As noted this record may also include the payment of a cash premium to the physician or agent, for instance, or such record may with perfect propriety indicate the payment of a cash premium only, to the cashier or agent only, in remote communities with obvious modifications of the wording and lines on the strip and policies, and which payment of a cash payment only, might also be attached to and made a part of the policy retained by the insured.

The advantages of the invention are thought to be obvious. In effect the company pays the insured to have the periodic examination made, to the great benefit of both the insured and the insurer by extending the life of the insured. Clearly it would be an improper use of the examinations to permit knowledge of the results to be used in cancelling the policy, except in cases of fraud or misrepresentation, or even to prevent the obtaining of subsequent policies. The examinations must show the insured the facts and tendencies of his physical condition. Under such conditions it is thought that the policies would be of great interest and financial value to both interested parties, the insured and insurer, and do much to prolong life and increase public health. Fire insurance companies examine their risks regularly. Life insurance companies should do likewise and save lives as well as money.

I claim as my invention:

In a sheet having a form of contract constituting an insurance policy printed thereon, the combination with a columnar listing of points of examination, a columnar listing of periodic dates for examinations at right angles to said first named listing, a plurality of lines separating each of the said listings into their components, the intersection of said lines forming spaces for the periodic entry of data in reference to the entire listing of points of examination, of a plurality of detachable strips, each of the said strips registering with the columnar spaces formed by the lines dividing the periodic listing.

In testimony whereof I affix my signature.

EDWARD BURKE WILFORD.